Patented Dec. 27, 1938

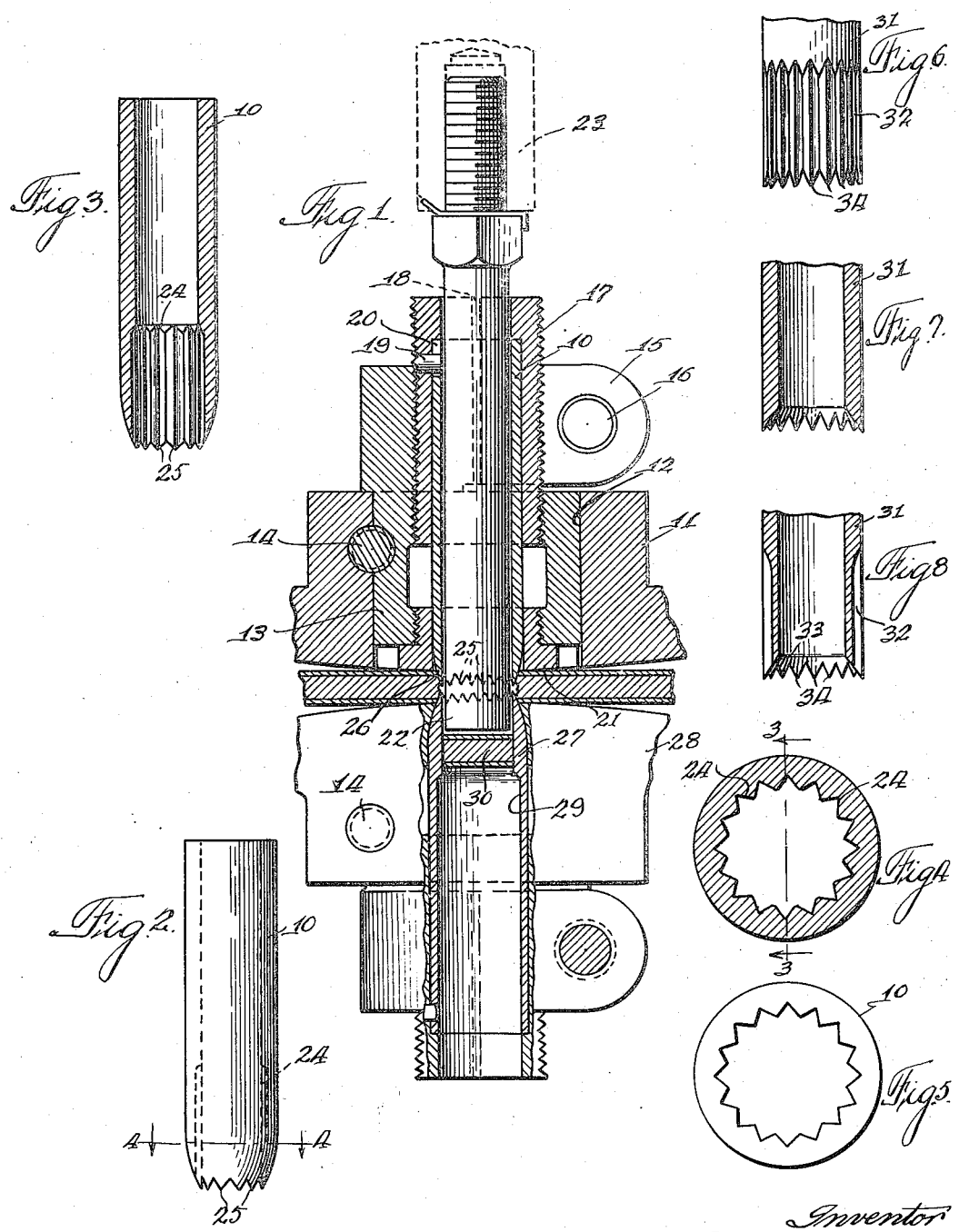

2,141,492

UNITED STATES PATENT OFFICE 2,141,492

CUTTING TOOL

Charles Russel Southwick, Chicago, Ill., assignor to United States Gypsum Company, Chicago, Ill., a corporation of Illinois Application October 11, 1937, Serial No. 168,378

17 Claims. (Cl. 164—124)

My invention relates to cutting or perforating tools, more particularly to cutting or perforating tools adapted to be pressed or forced into a body or sheet so as to form perforations or slits therein, and has for an object the provision of a simple and reliable tool of this character which is highly efficient in its cutting or perforating operation.

Cutting or perforating tools have heretofore been provided consisting of a shank adapted to be gripped by suitable operating means, the shank being provided with a suitable cutting edge. For perforating work the shank portion is ordinarily a hollow tubular body and one or both surfaces of this body are tapered adjacent one end to provide at the intersection of the surfaces a substantially continuous knife edge.

As will be understood by those skilled in the art, the force necessary to cause a substantially continuous knife edge of this character to penetrate the object being perforated must be of considerable magnitude, since the knife edge initially engages the surface of the object along a continuous line. In order to reduce the initial force required for penetration, it has been proposed to notch the cutting edge of the tool so as to provide a plurality of cutting teeth having sharp points which may be forced into the object with a relatively small operating force.

Toothed cutting tools of this character have not been entirely satisfactory, however, because of the fact that the cutting teeth taper outwardly in accordance with the taper of the opposite surfaces of the cutting tool, the thickness of each tooth at the base thereof being determined, of course, by the thickness of the tool body, the degree of taper utilized, and the depth of the teeth. In order to provide sufficient strength it is of course necessary that the teeth be relatively thick adjacent their bases, and accordingly the sides of each tooth adjacent the base thereof present broad, flat surfaces which offer considerable resistance to further penetration of the cutting tool into the object being perforated, and which may effect tearing of the object.

Accordingly, something is yet to be desired in perforating or cutting tools of this character, and it is a further object of my invention to provide a perforating tool having a toothed cutting edge in which the sides of each tooth constitute knife edges and in which the base of each tooth is of substantial thickness to provide suitable mechanical strength.

In carrying out my invention in one form, I provide a cutting tool comprising a shank or body member one surface of which tapers inwardly toward the other surface adjacent one end, and the other surface of which is grooved adjacent that end so that the tapering surface intersects the grooved surface to form a plurality of cutting teeth having substantial thickness at the base of each tooth, and knife edges which extend from the tip of each tooth to the base thereof.

More specifically, I provide a perforating tool comprising a hollow tubular body the outer surface of which tapers inwardly adjacent one end, and the inner surface of which is provided with a plurality of axially extending, substantially V-shaped grooves so that the inwardly tapering surface intersects the inner grooved surface to form a plurality of cutting teeth on the tool, the intersection of the tapering surface with the crests between adjacent V-shaped grooves forming the tips of the cutting teeth, and the intersection of the tapering surface with the walls of each groove forming knife edges extending from the tip to the base of each tooth.

For a more complete understanding of my invention, reference should now be had to the drawing, in which:

Figure 1 is a fragmentary cross sectional view of a preferred form of perforating apparatus provided with my improved perforating tool;

Fig. 2 is an elevational view of the cutting tool shown in Fig. 1;

Fig. 3 is an elevational sectional view taken along the line 3—3 of Fig. 4;

Fig. 4 is a cross sectional view taken along the line 4—4 of Fig. 2;

Fig. 5 is a bottom plan view of the cutting tool shown in Fig. 2;

Fig. 6 is a fragmentary elevational view of another embodiment of my invention; and Figs. 7 and 8 are elevational sectional views of the device shown in Fig. 6, the section lines of Figs. 7 and 8 corresponding respectively to the section lines of Figs. 1 and 3.

Referring now to Fig. 1, although my invention is not limited thereto, I have shown my improved cutting tool 10 as applied to a perforating mechanism of the type fully described and claimed in a co-pending application of John Page, Serial No. 168,343, filed October 11, 1937, entitled Perforated sheet materials and process and apparatus for forming the same. As is more fully described in the said Page application, the perforating mechanism includes a pair of spaced perforating wheels or rollers, the peripheries of which are provided with a plurality of circumferentially spaced perforating tools, the cutting edges of which extend outwardly from the peripheral surfaces. The adjacent peripheral surfaces of the perforating rolls or wheels are spaced apart a distance equal to the thickness of the material to be perforated, and the wheels are driven in synchronism so that as the material passes between the wheels the cutting tools are forced inwardly from the opposite surfaces of the material partially to sever a segment of a shape and size determined by the character of the cutting tools employed.

In order to complete the perforating operation, one of the perforating wheels, as is more fully described in the said Page application, is provided with a plurality of ejecting members or plungers positioned within the hollow cutting tools carried by one of the perforating rolls, the ejecting plunger being reciprocated by suitable mechanism operated in synchronism with the perforating rolls so that at the instant that the upper and lower cutting tools assume an aligned position the ejecting plunger is forced outwardly to eject the partially severed segment and complete the perforating operation.

In the drawing I have shown only a portion 11 of the periphery of one of the upper perforating rolls, which portion is provided with an aperture 12 for receiving a bushing 13 which carries the cutting tool 10. As shown, the bushing 13 and the aperture 12 are arranged to receive a tapered pin 14 so as to retain the bushing in the aperture and prevent relative rotation of the bushing, the upper portion of the bushing 13 being split to provide a pair of extending ears 15, only one of which is shown, for receiving a clamping bolt 16. The bushing is internally threaded to receive a threaded sleeve 17 in which the cutting tool 10 is supported, and the sleeve 17 is provided with a plurality of axially extending slots 18, only one of which is shown, so that when the clamping bolt 16 is tightened the bushing 13 positively grips the sleeve 17, which in turn positively grips the cutting tool 10. In addition, the sleeve 17 is provided with an inwardly extending pin 19 which cooperates with a notch 20 in the upper end of the cutting tool 10 to prevent relative rotation between the cutting tool 10 and the sleeve 17.

Adjacent its lower end the bushing 13 is provided with a second set of internal threads for cooperatively engaging a nut 21 which serves properly to position the lower end of the cutting tool 10. Disposed within the tubular cutting tool is the reciprocating plunger or ejecting member 22 referred to above, the upper end of the plunger 22 being connected to an operating bar 23 which is driven by suitable cam mechanism (not shown) to effect reciprocation of the plunger 22 in synchronous relation to the rotation of the perforating wheel 11. In the drawing the plunger 22 is shown in its extended or ejecting position.

Referring now to Figs. 2 to 5 inclusive, in which I have shown somewhat more clearly the constructional details of the perforating or cutting tool that I now consider to be a preferred embodiment of my invention, it will be seen that the outer surface of the tubular cutting tool 10 is curved so as to taper inwardly adjacent the lower end of the tool, and that the inner surface of the tool is provided with a plurality of substantially V-shaped grooves 24 adjacent the lower end so that the inwardly tapering surface intersects the grooved surface to provide a plurality of cutting teeth 25 on the lower edge of the tool. It will be apparent that the intersection of the tapering outer surface with the crests between the adjacent grooves forms the tips of the teeth 25, and that the intersection of the inwardly tapering surface with the side walls of the grooves 24 forms knife edges which extend from the tip of each tooth to the base thereof. Thus it will be seen that in my improved cutting tool no blunt, flat surfaces are presented to the material to be cut or perforated, and it will likewise be seen that the cutting teeth in my improved tool have a substantial thickness adjacent the base thereof to provide the desired mechanical strength. Thus, as shown in Fig. 1 which represents a section through the tool taken along a line corresponding to the line 1—1 of Fig. 4, i. e., a line taken through diametrically opposite crests between the grooves 24, the cutting teeth have a substantial thickness at the point indicated by the reference numeral 26.

It will of course be understood that the outer surface of the cutting tool 10 may include a flat beveled portion instead of the curved surface shown adjacent the lower end of the tool, but for use in rotating apparatus of the type described above it is advisable to employ a curved surface in order to provide for proper entry and withdrawal of the tool from the material being perforated. A particular advantage of cutting tools embodying my invention is that the tool is susceptible of repeated resharpening without special equipment by simply dressing or reforming the tapered face, and that the cutting teeth retain their original shape even after repeated resharpening.

As shown in Fig. 1, the corresponding perforating or cutting tool 27 in the lower perforating wheel 28 is substantially identical with the upper tool 10, except that the shank of the tool 27 is counter-bored to provide a portion 29 having a slightly enlarged internal diameter so as to permit the ejected segments, one of which is indicated by the reference numeral 30, to be freely discharged through the lower tool after ejection by the plunger 22.

In Figs. 6 to 8, inclusive, I have shown a modified form of cutting tool embodying my invention as comprising a tubular shank 31, the outer surface of which is provided adjacent one end with a plurality of grooves 32, and the inner surface of which includes a tapered portion 33 intersecting the grooved surface 32 to form a plurality of knife-edged cutting teeth 34 similar to the teeth 25 on the tool 10. The cutting tool 31 is susceptible of ready manufacture without special equipment or operations and is particularly adaptable for use in reciprocable perforating devices in which a rectilinear movement of the tool is provided.

While I have shown my improved cutting tool as formed from a hollow tubular body, it will be apparent that my invention is not limited thereto since the body portion or shank of the tool may be given any desired configuration, and it will likewise be apparent that cutting or perforating tools embodying my invention are not limited to use in the particular perforating mechanism shown, but as indicated above may be applied to various other types of mechanism, as for example reciprocating devices, commonly known as punch presses, and the like.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

Having thus described my invention, what I claim and desire to secure by Letters Patent is:

1. A cutting tool comprising a hollow tubular body the outer surface of which tapers inwardly adjacent one end and the inner surface of which is grooved adjacent said end so that said inwardly tapering surface intersects said grooved surface to form a plurality of cutting teeth on said tool.

2. A cutting tool comprising a hollow tubular body the outer surface of which tapers inwardly adjacent one end and the inner surface of which is grooved adjacent said end so that said inwardly tapering surface intersects said grooved surface to form a plurality of cutting teeth on said tool having knife edges which extend from the tip of each tooth to the base thereof.

3. A cutting tool comprising a hollow tubular body the outer surface of which tapers inwardly adjacent one end and the inner surface of which is grooved adjacent said end so that said inwardly tapering surface intersects said grooved surface to form a plurality of cutting teeth on said tool having substantial thickness at the base of each tooth and knife edges which extend from the tip of each tooth to the base thereof.

4. A cutting tool comprising a hollow tubular body the outer surface of which tapers inwardly adjacent one end and the inner surface of which is provided with a plurality of axially extending grooves adjacent said end so that said inwardly tapering surface intersects said grooves to form a plurality of cutting teeth on said tool.

5. A cutting tool comprising a hollow tubular body the outer surface of which tapers inwardly adjacent one end and the inner surface of which is provided with a plurality of axially extending substantially V-shaped grooves adjacent said end so that said inwardly tapering surface intersects said inner grooved surface to form a plurality of cutting teeth on said tool, the intersection of said tapering surface with the crests between adjacent grooves forming the tips of said teeth, and the intersection of said tapering surface with the walls of each groove forming knife edges extending from the tip to the base of each tooth.

6. A perforating tool adapted to be pressed into a body to form a perforation therein comprising a hollow tubular member the outer surface of which tapers inwardly adjacent the working end and the inner surface of which is grooved adjacent said end so that said tapering surface intersects said grooved surface to provide a toothed cutting edge.

7. A perforating tool adapted to be pressed into a body to form a perforation therein comprising a hollow cylindrical shank member the outer surface of which tapers inwardly adjacent the working end, and the inner surface of which is provided with a plurality of axially extending V-shaped grooves so that the inwardly tapering surface intersects said grooves to form a plurality of cutting teeth, the intersection of said tapering surface with the crests between adjacent grooves forming the tips of said teeth, and the intersection of said tapering surface with the walls of each groove forming knife edges extending from the tip to the base of each tooth.

8. A cutting tool comprising a shank member one surface of which tapers inwardly adjacent an edge thereof and the other surface of which is grooved so that said inwardly tapering surface intersects said grooved surface to provide a plurality of cutting teeth along said edges.

9. A cutting tool comprising a shank member one surface of which tapers inwardly adjacent an edge thereof and the other surface of which is grooved so that said inwardly tapering surface intersects said grooved surface to provide a plurality of cutting teeth along said edges having substantial thickness at the base of each tooth, and knife edges which extend from the tip of each tooth to the base thereof.

10. A cutting tool comprising a shank member one surface of which tapers inwardly adjacent an edge thereof and the other surface of which is provided with a plurality of V-shaped grooves extending substantially at right angles to said edge, so that said inwardly tapering surface intersects said grooves to form cutting teeth along said edge, the crests between adjacent grooves forming the tips of said teeth, and the walls of each groove forming knife edges which extend from the tip to the base of each tooth.

11. A cutting tool for use in a perforating device of the type in which a pair of similar cutting tools are forced into opposite surfaces of a body to form a partially severed segment which segment is thereupon ejected through the shank of one of the tools, said tool comprising a tubular shank one surface of which is grooved adjacent one end and the other surface of which is tapered so as to intersect said grooved surface and form a plurality of knife-edged cutting teeth, said shank including a portion of enlarged internal diameter extending from a point adjacent said teeth to the opposite end thereof to permit said ejected segments to pass freely therethrough.

12. A cutting tool for use in a perforating device of the type in which a pair of similar cutting tools are forced into opposite surfaces of a body to form a partially severed segment which segment is thereupon ejected through the shank of one of the tools, said tool comprising a tubular shank one surface of which is grooved adjacent one end and the other surface of which is tapered so as to intersect said grooved surface and form a plurality of knife-edged cutting teeth, said shank being counterbored from the opposite end thereof to a point adjacent said cutting teeth to provide an enlarged internal diameter portion through which said ejected segments freely pass.

13. A cutting tool comprising a hollow tubular body one surface of which is tapered adjacent one end and the other surface of which is grooved adjacent said end so that said tapered surface intersects said grooved surface to form a plurality of cutting teeth on said tool.

14. A cutting tool comprising a hollow tubular body the inner surface of which tapers outwardly adjacent one end and the outer surface of which is grooved adjacent said end so that said outwardly tapering surface intersects said grooved surface to form a plurality of cutting teeth on said tool.

15. A cutting tool comprising a hollow tubular body the inner surface of which tapers outwardly adjacent one end and the outer surface of which is grooved adjacent said end so that said outwardly tapering surface intersects said grooved surface to form a plurality of cutting teeth on said tool having knife edges which extend from the tip of each tooth in the base thereof.

16. A cutting tool comprising a hollow tubular body the outer surface of which tapers inwardly with a uniform radius of curvature adjacent one end and the inner surface of which is grooved adjacent said end so that said inwardly tapering surface intersects said grooved surface to form a plurality of cutting teeth on said tool.

17. A perforating tool adapted to be mounted on a rotatable perforating wheel with the cutting edge of said tool projecting beyond the periphery of said wheel so that when a body is passed along the periphery of said wheel said tool is pressed into said body and immediately withdrawn, said tool comprising a hollow tubular member the outer surface of which tapers inwardly with a uniform radius of curvature adjacent the working end and the inner surface of which is grooved adjacent said end so that said curved tapering surface intersects said grooved surface to provide a toothed cutting edge, the curvature of the outer surface of said working end providing for entry and withdrawal of said tool from said body without crushing the body around the edges of the perforation formed by said tool.

CHARLES RUSSEL SOUTHWICK.